United States Patent Office 2,950,146
Patented Aug. 23, 1960

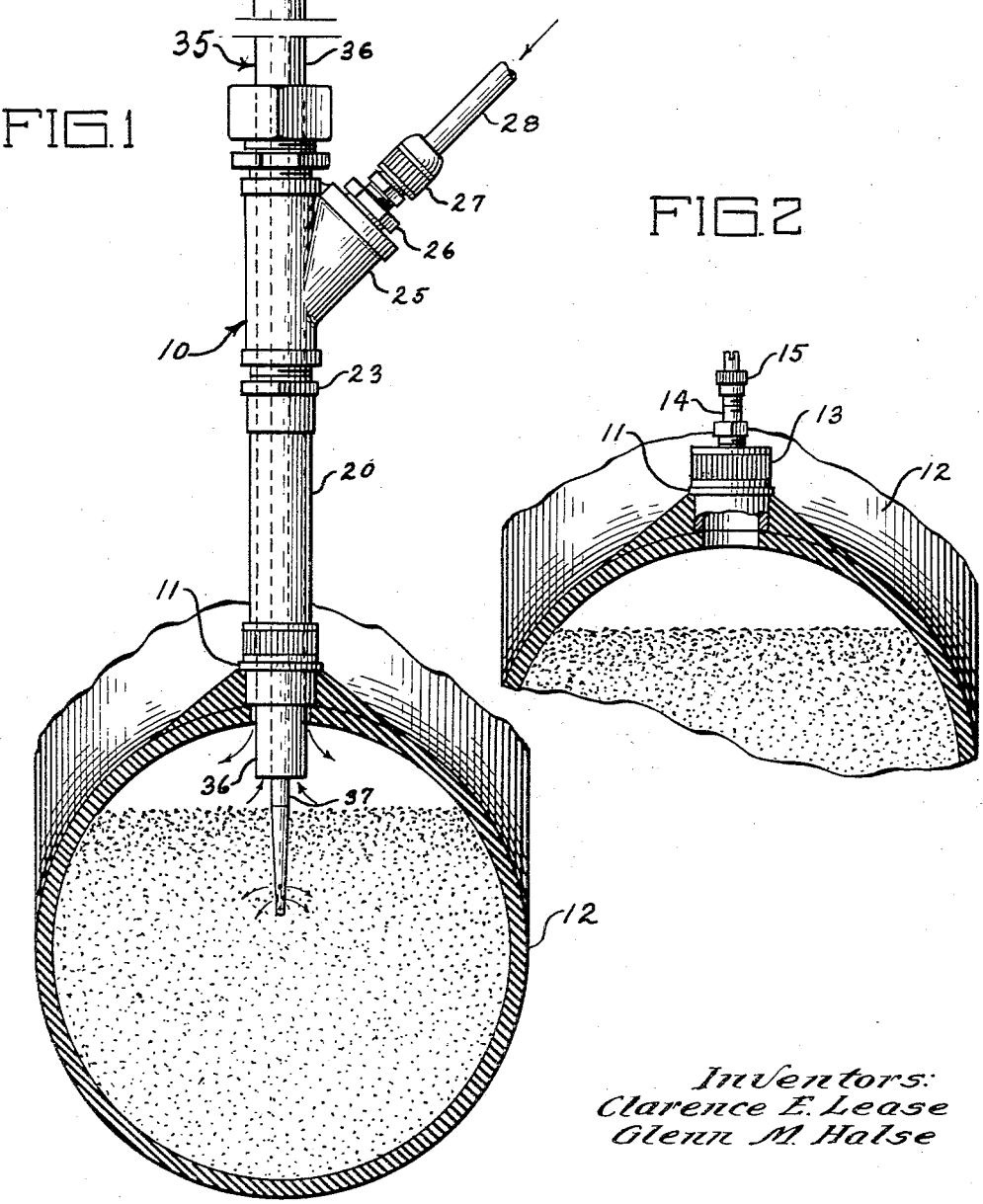

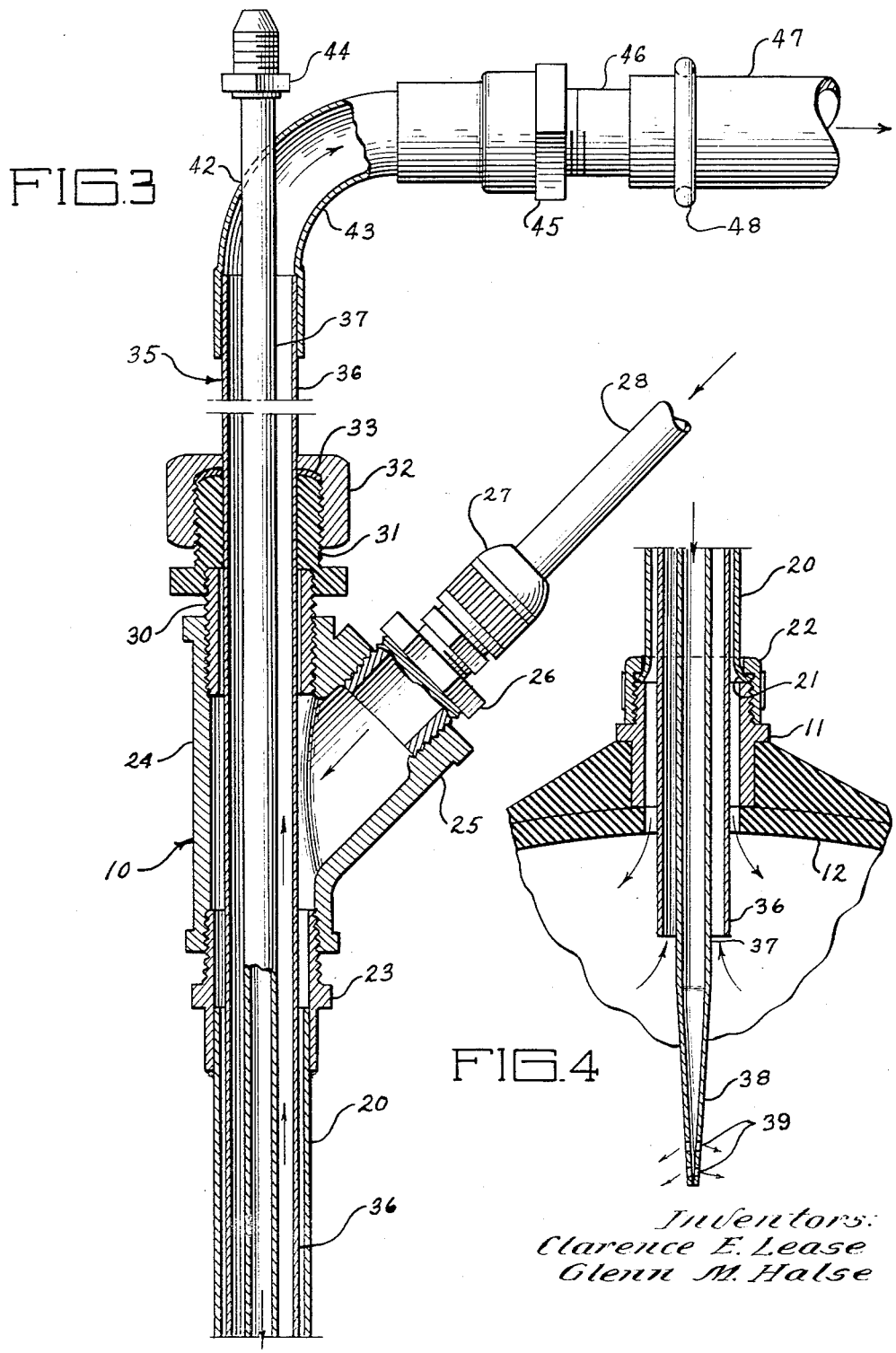

2,950,146

APPARATUS FOR REMOVING BALLAST FROM VEHICLE TIRES

Clarence E. Lease, 1816 S. Summit Ave., Sioux Falls, S. Dak., and Glenn M. Halse, 679 Frank Ave., Huron, S. Dak.

Filed Mar. 13, 1959, Ser. No. 799,327

6 Claims. (Cl. 302—58)

This invention relates generally to the removal of ballast from the tires of work vehicles. More particularly, the invention is directed to apparatus for removing finely divided particulate solids used as ballast in vehicle tires to increase the vehicle weight for improved traction for the vehicle.

In the case of farm tractors, earth moving tractors, and other work vehicles required to draw heavy loads over soft or loose soil, a problem arises in obtaining sufficient traction for the driving wheels in such soil with only the weight of the vehicle to provide such traction. Additional traction has been obtained to increase the drawbar pulling power of the vehicle by adding weights in the form of cast iron members secured to the driving wheels. Another proposal for weighting the vehicle to increase the traction of its driving wheels and thereby increase the drawbar pulling power has been to introduce liquid ballast into the tires. Under prior proposals, a mixture of water and calcium chloride or similar salt has been used as ballast by being introduced into the vehicle tires through the valve stem. The salt in such a mixture serves the dual purpose of increasing the specific gravity of the mixture and also to prevent freezing of the liquid.

Liquid ballast material has the objectionable drawback of creating a loping or lurching action during movement of the work vehicle due to the uneven and continually changing distribution of the liquid ballast. This loping or lurching causes unevenness or erratic vehicle operation resulting in loss of a certain amount of driving energy.

More recently it has been proposed to use solid ballast in the tires to provide the desired additional weight while overcoming the loping or lurching action during operation of the vehicle which characterically results where liquid ballast is used. Such solid ballast in the form of finely divided particulate material is introduced into the vehicle tire to provide the desired added weight for improved traction of the vehicle.

By mixing solids of different specific gravities, it is feasible to obtain a mixture having a particular specific gravity to provide the desired ballast weight with the vehicle tire filled to about 90% of its volume. By selecting appropriate proportions of the different solids the total added weight may be varied as desired. The ability to control the specific gravity of the ballast material is desirable in that, when performing different types of work and under different soil conditions, it may be desirable to have different ballast weight added to the vehicle.

The advantage of a particulate solid ballast, in alleviating the loping or lurching action encountered where liquid ballasts are used, is most pronounced where the vehicle tires are filled to about 65% to about 90% of the total volume with the ballast particles of mesh size around 200 mesh. Under such conditions, the relatively small volume of air remaining within the tire tends to intermingle with the ballast particles until the mass of ballast in effect is expanded and distributed throughout the entire volume of the tire.

Under conditions where it is desired to change the ballast weight as where the tractor or other work vehicle is to be used for a different purpose, in different soil conditions or in connection with different types of work, it is necessary to remove the ballast from the tire and reintroduce a ballast material of appropriate specific gravity to give the desired total added weight to the vehicle. Also where repairs to the vehicle tires become necessary or where it is desired to operate the tractor or work vehicle without ballast weight, it is, of course, necessary to remove the ballast from the ballasted tires. The particulate solid ballasts which have been recently adopted and used create a problem in removal in that they may become compacted in the tire, thus making it difficult to obtain effective removal of such a ballast by merely draining the ballast through the valve stem. Additionally, the finely divided particulate ballast tends to bridge over the exit through the valve stem to prevent free drainage of ballast through the valve stem. The instant invention is directed to a method for removing particulate solid ballast and to a device connectable with the vehicle tire valve stem and particularly designed and useable for removing finely divided particulate solid ballast from the tire. This device is effective when attached to the valve stem and appropriately supplied with air under pressure to introduce air beneath the surface of the ballast within the tire to render the ballast flowable and apply air pressure above the surface of the ballast to urge the ballast to flow through an eductor pipe extending through the valve stem.

Accordingly, it is a principal object of this invention to provide an improved device for use in removing ballast from ballasted work vehicle tires.

A further and more specific object of this invention is to provide a device especially suited and useable for removing finely divided particulate solid ballast from vehicle tires.

Another object of this invention is to provide a device for removing particulate solid ballast from vehicle tires including passage means for introducing air into the tire and an eductor pipe to receive and conduct ballast from the tire.

It is also an object of the instant invention to provide a device for removing particulate solid ballast from vehicle tires as recited in the previous object wherein said passage means includes a passage to introduce air into the ballast within the tire beneath the surface of such ballast and a passage for introducing air into the interior of the tire above the surface of the ballast.

The above and more specific objects of the invention will become apparent by reference to the description given hereinafter of a specific embodiment of the invention taken in connection with the accompanying drawings in which:

Figure 1 is an elevational view of the device of this invention shown connected to the valve stem of a vehicle tire from which ballast is to be removed;

Figure 2 is a detail view illustrating a closure for the valve stem of the vehicle tire with ballast therein;

Figure 3 is a sectional view of a portion of the device shown in Figure 1; and

Figure 4 is a sectional view of the portion of the device not shown in Figure 3 showing the device connected to the valve stem of a vehicle tire.

Referring to the drawings and particularly to Figure 1, the ballast removing device 10 is shown connected to a valve stem 11 of a representation of a vehicle tire 12. In the drawings the tire is not shown in detail or in its entirety since it forms no part of the instant invention. It will be readily recognized that the method and device of this invention are equally useable in removing ballast from vehicle tires of either the tube type or the so-called tubeless type. In either case the ballast is removed through the valve stem as provided on the tube of the tube type or on the wheel rim in the case of tubeless tires.

In using the device of the instant invention for removing particulate solid ballast, the conventional valve stem which has a relatively small bore therethrough to retain the standard air valve core is replaced with a valve stem such as shown on the drawings at 11. Valve stem 11, as shown in Figure 4, provides an appropriately large passage both for removal of the particulate ballast and for introduction of air into the tire as required in connection with the ballast removing operation.

As shown in Figure 2, the tire 12 in its ballasted state will have the valve stem 11 thereof closed by a suitable cap 13 provided with a stem 14 to contain the conventional air valve core, which stem may be closed by a suitable screw-on valve cap 15.

The details of the ballast removing device 10 are best shown in Figures 3 and 4, Figure 4 in effect being a continuation of Figure 3 and showing the end of the device which is connected to the valve stem 11 on the tire 12.

The device 10 includes an outer tubular member which includes a cylinder 20. Cylinder 20 has one end thereof flared outwardly at 21 to retain an internally threaded coupling 22 on the cylinder which cooperates with the threads on valve stem 11 in attaching the device in position for removal of ballast. A connector 23 is welded to the other end of the cylinder 20 with the connector threaded into a fitting 24. Fitting 24 has a lateral passage 25 carrying a reducer 26 to which is coupled by coupling 27 an air hose 28. Thus, with the device affixed to the tire valve stem 11, air pressure can be introduced through hose 28 and into the tire as shown by the arrows on Figures 3 and 4.

The end of fitting 24 opposite connector 23 is provided with an internally threaded bore carrying a nipple 30. A sleeve member 31 is threaded onto the outer end of nipple 30 and an annular cap 32 in turn threaded onto the outer end of sleeve member 31. A suitable packing 33 is disposed between the end of sleeve member 31 and annular cap 32.

The packing 33 serves the dual function of providing a seal against loss of air pressure from the tubular member and in offering frictional resistance to movement of the assembly, described hereinafter, relative to the sleeve member. The sleeve member provides a guide bore to slidably support the assembly as will be described.

An assembly 35 is slidably mounted concentrically within the tubular member to extend through sleeve member 31, fitting 24, cylinder 20 and valve stem 11, and be insertable into the tire to the position as shown in Figures 1 and 4. This assembly includes an eductor pipe 36 for carrying ballast as it is removed from the tire and a tube 37 disposed concentrically within the eductor pipe for introducing air beneath the surface of the ballast to render the ballast flowable. The end of tube 37 as shown in Figures 1 and 4 tapers inwardly at 38 and is provided with perforations 39 at its lower end.

It will be noted from Figures 1 and 4 that the tapered end 38 of tube 37 extends beyond the end of eductor pipe 36. This relationship of the ends permits the assembly when inserted into the vehicle tire, in relation to the ballast as shown in Figure 1, to have the tapered end 38 and the perforations thereon disposed beneath the surface of the ballast while the end of eductor pipe 36 is disposed adjacent and above the ballast surface to receive the ballast particles as they flow out of the tire under the action of the air introduced into the tire. Tube 37 is used to introduce only a small or limited amount of air into the particulate ballast to render the ballast flowable. The tapered end 38 and perforations on tube 37 facilitate introduction of the tube into the ballast and distribution of the limited amount of air which is discharged into the ballast.

The upper end of tube 37 is secured at 42 to an elbow 43 secured to and extending upwardly from the eductor pipe 36. The outer end of tube 37 has an externally threaded fitting 44 for connecting an air hose thereto so that a limited amount of air may be introduced into the ballast through perforations 39. Elbow 43 has an internally threaded coupler 45 having mounted therein a nipple 46. A hose 47 is secured by a suitable hose clamp 48 to nipple 46 to convey ballast from the eductor tube of the device as it flows from the tire. Hose 47 is preferably led to a suitable separator (not shown) whereat the particulate ballast may be collected for reuse as desired and the air, entrained with the ballast particles to render the ballast flowable, separated from such particles.

A brief résumé may be given as to the manner of use of the device described hereinabove. With the enlarged valve stem 11 cooperating with the interior of the tire the closure cap 13 (Figure 2) is removed and the device 10 attached to the valve stem by coupling 22. The assembly 35 is thereupon moved relative to the tubular member to insert the ends of eductor pipe 36 and tube 37 into the tire to the position as shown in Figure 1. Reducer 26 and fitting 44 are connected to suitable air pressure supplies to introduce through tube 37 a limited amount of air to render the ballast flowable by such air being introduced through perforations 39 beneath the surface of the ballast and a further quantity of air is introduced through cylinder 20 and into the tire above the surface of the ballast in the position of the tire as shown in Figure 1.

With the ballast rendered flowable by the limited quantity of air flowing through perforations 39, the air flowing into the tire through the annular space between valve stem 11 and eductor pipe 36 acts to propel the particulate ballast upwardly into the eductor pipe 36 from which it is led through hose 47 to a suitable separator for recovery of the particulate ballast for reuse. As the surface level of the ballast within the tire lowers due to removal of ballast, the assembly 35 may be moved further into the tire to maintain the general relationship of the ends of pipe 36 and tube 37 to the ballast surface as shown in Figure 1.

We claim:

1. A device for use in removing ballast from ballasted vehicle tires comprising a tubular member having means on one end thereof to attach said member in alignment with the bore of a valve stem of the tire from which ballast is to be removed, an eductor pipe within said tubular member mounted to be slidable relative to said member and provide an air passageway intermediate said pipe and the interior of said tubular member, said eductor pipe having one end open to be movable from said one end of said tubular member and into the tire to receive and conduct ballast from the tire, means at the other end of said eductor pipe for connecting said pipe to convey the ballast to a storage point, a tube within said tubular member mounted to be slidable relative to said member to extend the end of said tube into the ballast within the tire, and means for connecting a source of air under pressure to said tubular member and said tube to introduce air into the tire and the ballast therewithin to induce flow of ballast from the tire.

2. A device for use in removing ballast from ballasted vehicle tires comprising a tubular member having means on one end thereof to attach said member in alignment with the bore of a valve stem of the tire from which ballast is to be removed, an assembly mounted within said tubular member to be slidable relative to said member while providing a passageway intermediate said assembly and the interior of said tubular member, said assembly including an eductor pipe for conducting ballast from the tire and a tube disposed concentrically of said eductor pipe for introducing air into the ballast within the tire, said pipe and tube each having one end open with the open end of said tube disposed beyond the open end of said pipe to provide an annular passage into said pipe through the open end thereof, means at the other end of said eductor pipe for connecting said pipe to convey the ballast to a storage point, and means for connecting a source of air under pressure to said tubular member and said tube to introduce air into the tire and the ballast therewithin to induce flow of ballast from the tire.

3. A device for use in removing ballast from ballasted vehicle tires comprising a tubular member having means on one end thereof to attach said member in alignment with the bore of a valve stem of the tire from which ballast is to be removed, an eductor pipe within said tubular member mounted to be slidable relative to said member and provide an air passageway intermediate said pipe and the interior of said tubular member, said eductor pipe having one end open to be movable from said one end of said tubular member and into the tire to receive and conduct ballast from the tire, means at the other end of said eductor pipe for connecting said pipe to convey the ballast to a storage point, a tube within said tubular member mounted to be slidable relative to said member to extend the one end of said tube beyond the open end of said eductor pipe and into the ballast within the tire, said tube having a plurality of perforations at said one end thereof to distribute air into the ballast material, and means for connecting a source of air under pressure to said tubular member and said tube to introduce air into the tire and the ballast therewithin to induce flow of ballast from the tire.

4. A device for use in removing ballast from ballasted vehicle tires comprising a tubular member having means on one end thereof to attach said member in alignment with the bore of a valve stem of the tire from which ballast is to be removed, an assembly mounted concentrically within said tubular member to provide an annular passageway intermediate said assembly and the interior of said tubular member, said assembly being slidable relative to said member to extend the end of said assembly into the tire when said device is attached to the tire valve stem, said assembly including an eductor pipe for conducting ballast from the tire and a tube disposed concentrically of said eductor pipe for introducing air into the ballast within the tire, said pipe and tube each having one end open with the open end of said tube disposed beyond the open end of said pipe to provide an annular passage into said pipe through the open end thereof, means at the other end of said eductor pipe for connecting said pipe to convey the ballast to a storage point, and means for connecting a source of air under pressure to said tubular member and said tube to introduce air into the tire and the ballast therewithin to induce flow of ballast from the tire.

5. A device for use in removing ballast from ballasted vehicle tires comprising, a tubular member carrying mounting means to attach said member in alignment with the bore of a valve stem of the tire from which ballast is to be removed, an eductor pipe within said tubular member mounted relative to said member to provide an air passageway intermediate said pipe and the interior of said tubular member, said eductor pipe having one end open to be movable into the tire through said mounting means to receive and conduct ballast from the tire, said tubular member having outlet means from said air passageway with said outlet means being disposed adjacent said one end of said eductor pipe, means for connecting said eductor pipe to convey the ballast to a storage point, a tube within said tubular member mounted to be slidable relative to said mounting means to extend the end of said tube into the ballast within the tire, and means for connecting a source of air under pressure to said tubular member and said tube to introduce air into the tire and the ballast therewithin to induce flow of ballast from the tire.

6. A device for use in removing ballast from ballasted vehicle tires comprising a tubular member carrying mounting means to attach said member in alignment with the bore of a valve stem of the tire from said ballast is to be removed, an eductor pipe within said tubular member mounted relative to said member to provide an air passageway intermediate said pipe and the interior of said tubular member, said eductor pipe having one end open to be movable into the tire through said mounting means to receive and conduct ballast from the tire, said tubular member having outlet means from said air passageway with said outlet means being disposed adjacent said one end of said eductor pipe, means at the other end of said eductor pipe for connecting said pipe to convey the ballast to a storage point, and means for connecting a source of air under pressure to said tubular member to introduce air through said air passageway and outlet means into the tire and the ballast therewithin to induce flow of ballast from the tire.

References Cited in the file of this patent

UNITED STATES PATENTS

| 2,286,776 | Williams | June 16, 1942 |
| 2,758,881 | Lassiat | Aug. 14, 1956 |

FOREIGN PATENTS

| 151,932 | Australia | June 17, 1953 |